United States Patent
Giambrone

(10) Patent No.: US 11,458,822 B2
(45) Date of Patent: Oct. 4, 2022

(54) METAMORPHOSIS CAR COVER

(71) Applicant: Joseph Giambrone, Kissimmee, FL (US)

(72) Inventor: Joseph Giambrone, Kissimmee, FL (US)

( * ) Notice: Subject to any disclaimer, the term of this patent is extended or adjusted under 35 U.S.C. 154(b) by 1134 days.

(21) Appl. No.: 16/022,358

(22) Filed: Jun. 28, 2018

(65) Prior Publication Data
US 2019/0001801 A1 Jan. 3, 2019

Related U.S. Application Data

(60) Provisional application No. 62/527,994, filed on Jun. 30, 2017.

(51) Int. Cl.
| | |
|---|---|
| *B60J 11/02* | (2006.01) |
| *B60J 11/04* | (2006.01) |
| *B60R 19/48* | (2006.01) |
| *B60R 11/00* | (2006.01) |

(52) U.S. Cl.
CPC ............... *B60J 11/02* (2013.01); *B60J 11/04* (2013.01); *B60R 11/00* (2013.01); *B60R 19/48* (2013.01); *B60R 2011/004* (2013.01); *B60R 2011/0082* (2013.01); *B60R 2011/0094* (2013.01)

(58) Field of Classification Search
CPC ............ B60J 11/02; B60J 11/04; B60R 19/48
See application file for complete search history.

(56) References Cited

U.S. PATENT DOCUMENTS

| | | | |
|---|---|---|---|
| 4,856,842 A * | 8/1989 | Ross | B60J 11/02 296/136.03 |
| 6,474,715 B2 | 11/2002 | Fukushima et al. | |
| 8,256,807 B2 | 9/2012 | Lucas | |
| 8,573,660 B2 | 11/2013 | Cha et al. | |
| 9,623,740 B1 * | 4/2017 | Tran | B60J 11/02 |
| 9,908,394 B2 * | 3/2018 | Romero Regalado | B60R 13/011 |
| 2001/0022450 A1 | 9/2001 | Delavalle et al. | |
| 2005/0140159 A1 | 6/2005 | Barber | |

* cited by examiner

*Primary Examiner* — Joseph D. Pape
(74) *Attorney, Agent, or Firm* — Wolter Van Dyke Davis PLLC; Erica M. Cipparone

(57) ABSTRACT

In embodiments herein, a vehicle cover device is provided. The device includes a vehicle cover member and a housing for receiving the vehicle cover member, including a first housing member and a second housing member hingeably associated with one another. The housing includes a roller rotatably disposed there within for receiving the vehicle cover member, the roller having a first and a second end, and being rotatable to roll the vehicle cover member into a retracted position, and to extend the vehicle cover member. The housing includes a first end member and a second end member for abutting the first and second ends, respectively, of the roller, and a biasing member associated with at least one of the first end member or the second end member to bias the roller in the first rotatable direction, wherein vehicle cover member is movable between an extended and a retracted position.

18 Claims, 5 Drawing Sheets

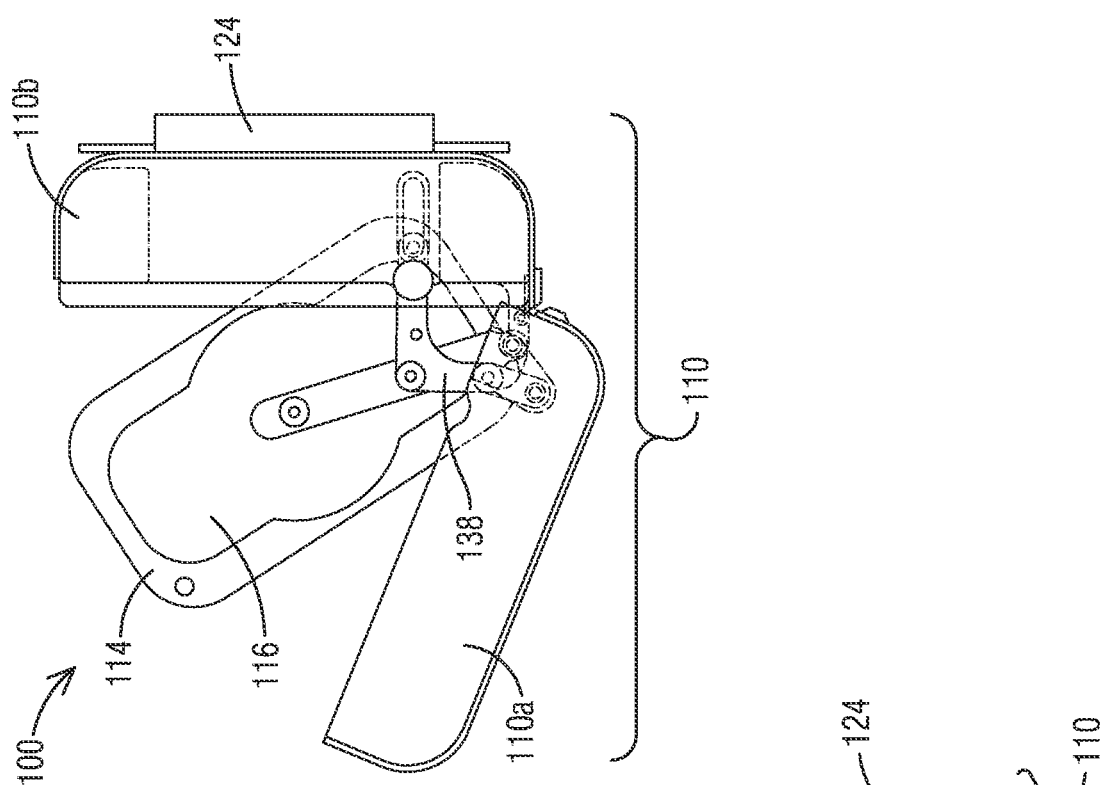
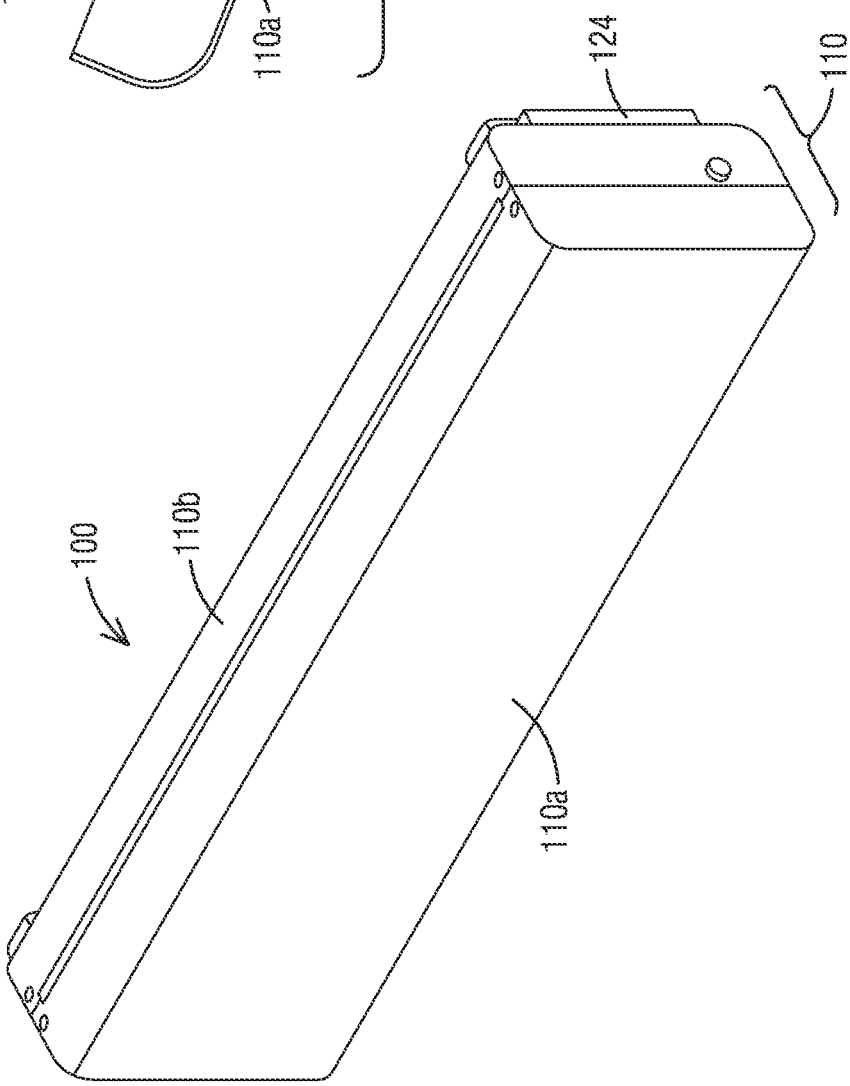

METAMORPHOSIS CAR COVER

CROSS-REFERENCE TO RELATED APPLICATIONS

This application claims priority to U.S. Provisional Application No. 62/527,994 filed on Jun. 30, 2017.

BACKGROUND

Vehicle owners may opt to apply a protective cover to their vehicles. Covers can be particularly useful in preventing a vehicle's interior from getting too hot, and for keeping the outer surface of the vehicle clean and free of debris. Covers may also be helpful in winter months and colder climates for preventing snow or ice from accumulating on the vehicle. Most car covers are large, bulky, and difficult to place over the vehicle. Moreover, car owners do not typically carry car covers with them when the are away from home; consequently, traditional car covers remain largely unused.

SUMMARY

In a first embodiment, a vehicle cover device is provided. The device includes a vehicle cover member and a housing for receiving the vehicle cover member, wherein the housing includes a first housing member and a second housing member, the first and second housing members are hingeably connected to one another allowing selective opening and closing of the housing. The housing further includes a roller rotatably disposed within the housing for receiving the vehicle cover member, the roller having a first end and a second end, and being rotatable in a first rotatable direction to roll the vehicle cover member around the roller in a retracted position, and a second rotatable direction to extend the vehicle cover member, the housing further includes a first end member and a second end member for abutting the first end and the second end, respectively, of the roller, and a biasing member associated with at least one of the first end member or the second end member to bias the roller in the first rotatable direction. In an embodiment, the vehicle cover device includes wherein vehicle cover member is movable between an extended position, wherein at least a portion of the cover is removed from the housing, and the retracted position, wherein the vehicle cover member is retracted within the housing.

In another embodiment there is provided, a vehicle cover device including a vehicle cover member, and a housing for receiving the vehicle cover member, wherein the housing includes a first housing member and a second housing member, the first and second housing members are hingeably connected to one another allowing selective opening and closing of the housing. The housing may further include a roller rotatably disposed within the housing for receiving the vehicle cover member, the roller having a first end and a second end, and being rotatable in a first rotatable direction to retract the vehicle cover member around the roller, and a second rotatable direction to extend the vehicle cover member from the housing. The housing may further include a first end member and a second end member for abutting the first end and the second end, respectively, of the roller, and a motor, wherein the motor is coupled to an electrical source, the motor configured to drive the extension, retraction, or a combination thereof, of the vehicle cover member upon actuation of the motor. The device may further include a wireless control receiver including circuitry for controlling the motor configured to selectively wirelessly control extension or retraction of the vehicle cover member, and a wireless control transmitter for actuating the motor by sending a signal to the wireless control receiver, such that the vehicle cover member is movable between an extended position, wherein at least a portion of the cover is removed from the housing, and the retracted position wherein the vehicle cover member is retracted within the housing.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1 is a perspective view of an embodiment of a vehicle cover device in a closed position.

FIG. 2 is an end view of an embodiment of a vehicle cover device in an open position.

DETAILED DESCRIPTION

Figure 3:
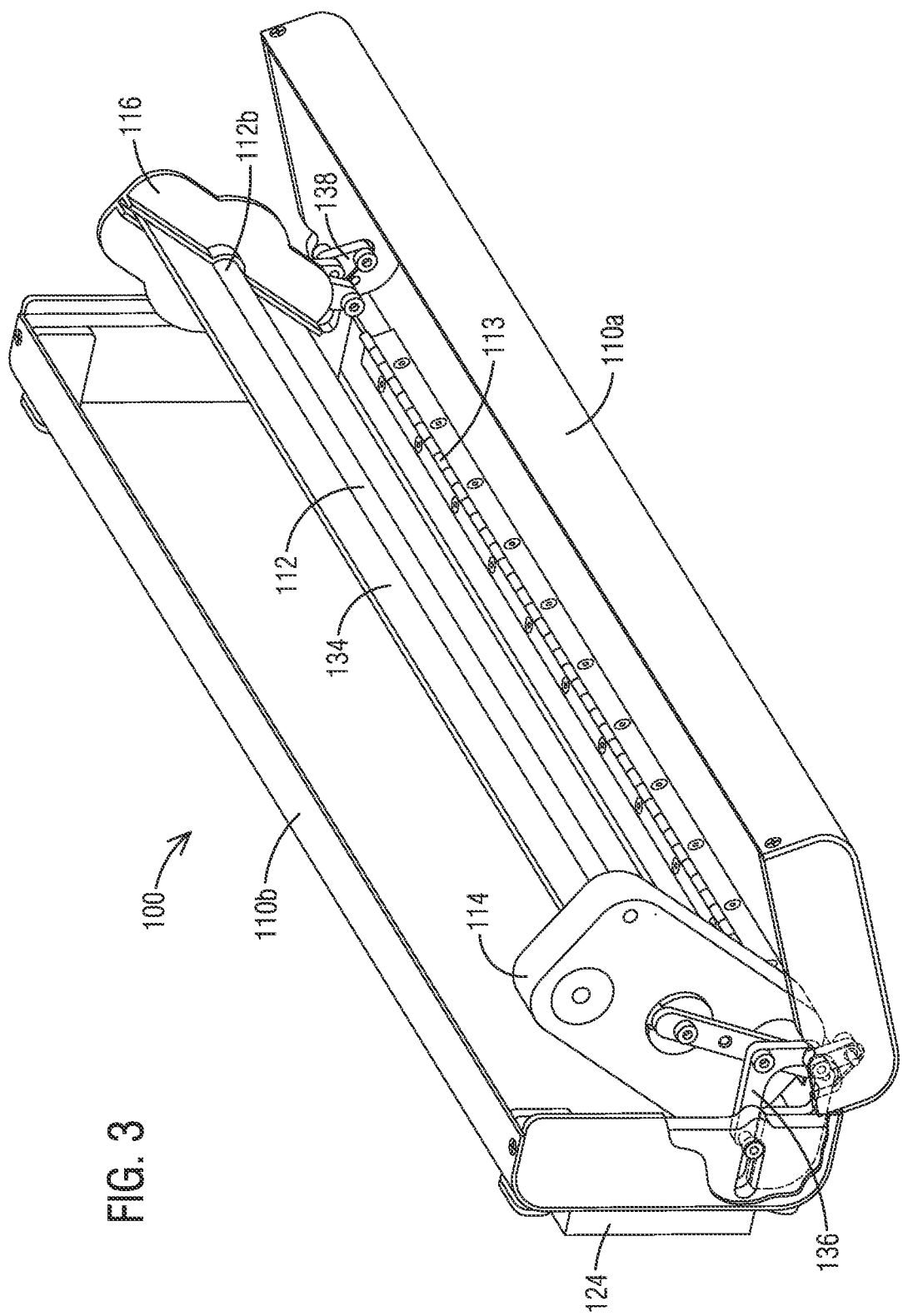
FIG. 3 is a top perspective view of an embodiment of a vehicle cover device in an open position.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

The term associated or association, as used herein, includes but is not limited to direct and indirect attachment, adjacent to, in contact with, partially or fully attached to, and/or in close proximity therewith.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

A perspective view of an embodiment of a vehicle cover device 100 is shown in FIG. 1, wherein the device 100 is provided in a closed position. The device includes a housing 110 with a first housing 110a and second housing 110b portion, wherein the first and second housing portions 110a, 110b are shown. Connecting the first and second housings 110a, 110b is a hinge member 113 (shown in FIG. 3). One attachment member 124 is shown extending from a rear portion of the device 100. The attachment member 124 is used to affix the device 100 onto a portion of a vehicle, in one non-limiting embodiment. The attachment member 124 may removably or permanently affix the device 100 onto the vehicle. In one embodiment, there may be two or more attachment members 124, wherein the attachment members 124 may each include a bracket for affixing the device housing 110 onto the bumper of a vehicle. In other embodiments, the attachment members 124 may include an adhesive or other attachment means for affixing the device 110 onto the vehicle.

FIG. 1 shows a side view of a vehicle cover device 100 in an open position, wherein first and second housings 110a, 110b are hinged open from one another revealing the internal mechanism of the device 100. Within the housing 110 is a vehicle cover member (shown in FIG. 6). The vehicle cover member is adapted to be connected to the housing 110 at one end, and wrapped around a portion of the internal mechanism of the device 100, such that the opposing end is free to be pulled over a vehicle while the device 100 is in use. The internal mechanism of the device 100 includes a roller 112 (shown in FIG. 3) rotatably disposed within the housing for receiving the vehicle cover member 120 (see FIG. 6), the roller 112 having a first end 112a and a second end 112b. The side view of FIG. 2 shows the second end of the device 100. The roller 112 includes a first end member 114 at the first end 112a thereof, and a second end member 116 at the second end 112b thereof. The roller 112 is rotatable in a first rotatable direction to roll the vehicle cover member 120 around the roller 112 to a retracted position within the housing 110, and in a second rotatable direction to extend the vehicle cover member 112 from the device housing 110 to cover a vehicle. The internal mechanism further includes a biasing member 118 (see FIG. 5) associated with at least one of the first end member 114 or the second end member 116 to bias the roller 112 in the first rotatable direction. In the embodiment 100 shown in FIGS. 1-8, the biasing member 118 is disposed within the first end member 114, configured to hold the biasing member 118. A first linking member 136 (shown in FIG. 3) connects between the first and second housings 110a, 110b and the first end member 114, and a second linking member 138 connects between the first and second housings 110a, 110b, and the second endmember 116. The linking members 136, 138 are configured to associate the components of the device 110 to allow rotation of the roller 112 relative to the housing 110 to selectively extend or retract the cover member 120 during use.

FIG. 3 is a front perspective view of the vehicle cover device embodiment 100 provided in an open position, wherein the first and second housings 110a, 110b are shown attached to one another via hinge member 113. The internal mechanism of the device 100 is viewable in FIG. 3, wherein the roller 112 is shown and the second end of the roller 112b associates with the second end member 116, the first end of the roller 112a (not show) associates with the first end member 114. The roller 112 is also associated with a roller platform 134 which extends from the roller 112, allowing the cover member 120 to rest thereon within the housing 110. In FIG. 3 the linking members 136, 138 are shown. Furthermore, the attachment member 124 is visible in FIG. 3, associated with a rear portion of the device housing 110.

Figure 4:
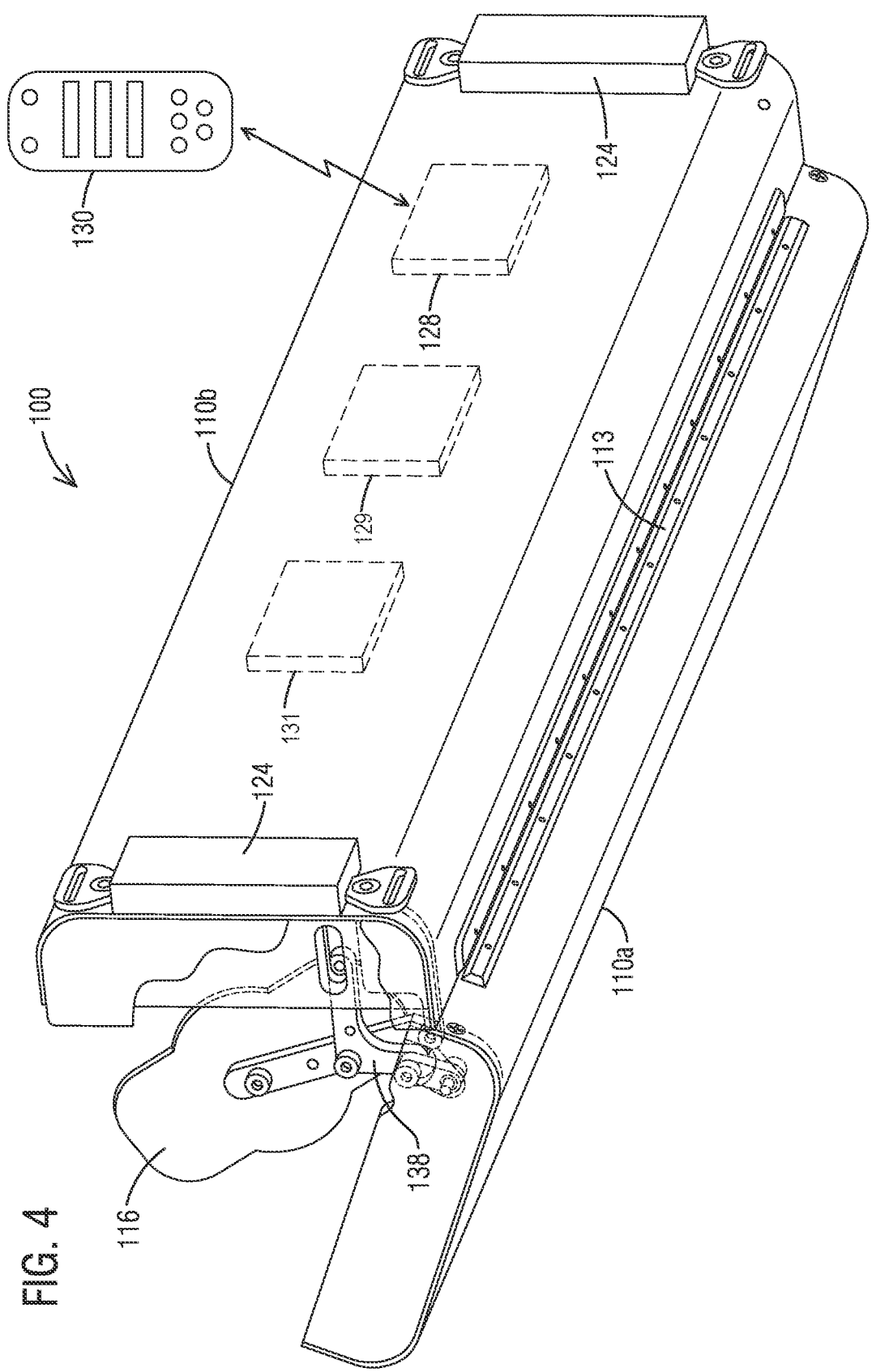
FIG. 4 is a bottom perspective view of an embodiment of a vehicle cover device in an open position.

FIG. 4 is a rear perspective view of a vehicle cover device embodiment 100 showing the device housing portions 110a, 110b, connected via hinge member 113, wherein the device is in an open position. The rear portion of the device includes attachment members 124, used to affix the device housing 110 onto the vehicle, in one non-limiting embodiment. Linking member 138 is attached to the second end member 116 and the first and second housing portions 110a, 110b. Within housing 110, a wireless control receiver 128 is provided, in one embodiment. The wireless control receiver 128 may be associated with a wireless control transmitter 130, which may be provided in a remote as shown in FIG. 4. In another example, the wireless control transmitter 130 may be within the vehicle itself, such that a user-controllable input device, such as a button in the vehicle may be used to interface with the wireless control receiver 128 of the device 100. The wireless control transmitter 130 and wireless control receiver 128 may be connected by way of radiofrequency, Bluetooth® or by any other means known to those skilled in the art. Signals may be sent wirelessly to and from the transmitter 130 to control the device 100 via the wireless control receiver 128. Consequently, operation of the car cover member 120 may be controlled via the remote, or via a car feature by way of the interaction between the wireless control transmitter 130 and the wireless control receiver 128. The wireless control receiver 128 is operably connected to the internal mechanism and/or the housings 110a, 110b of the device 100 such that opening and closing of the housing 110 and initiation of the rotation of the roller 112 may occur by way of the wireless control transmitter 130 via the wireless control receiver 128 in some embodiments.

The vehicle cover device 100 may further include a motor 129. The motor 129 may be coupled to an electrical source 131, the motor 129 being configured to drive the extension, retraction, or a combination thereof, of the vehicle cover member upon actuation of the motor 129. The electrical source 131 may include a battery operation, or the device may be adapted to the vehicle power outlet, or to an external wall outlet, in another embodiment.

In other embodiments, the device 100 may be manually controlled by manually extending the cover member 120 from the housing 110 by pulling on its first end, causing the roller 120 to rotate in a second rotatable direction against a resistance of the biasing member 118. Release of the cover member 120 would allow the cover member 120 to retract within the housing 110, by way of the roller 120 rotating in a first rotatable direction.

Figure 5:
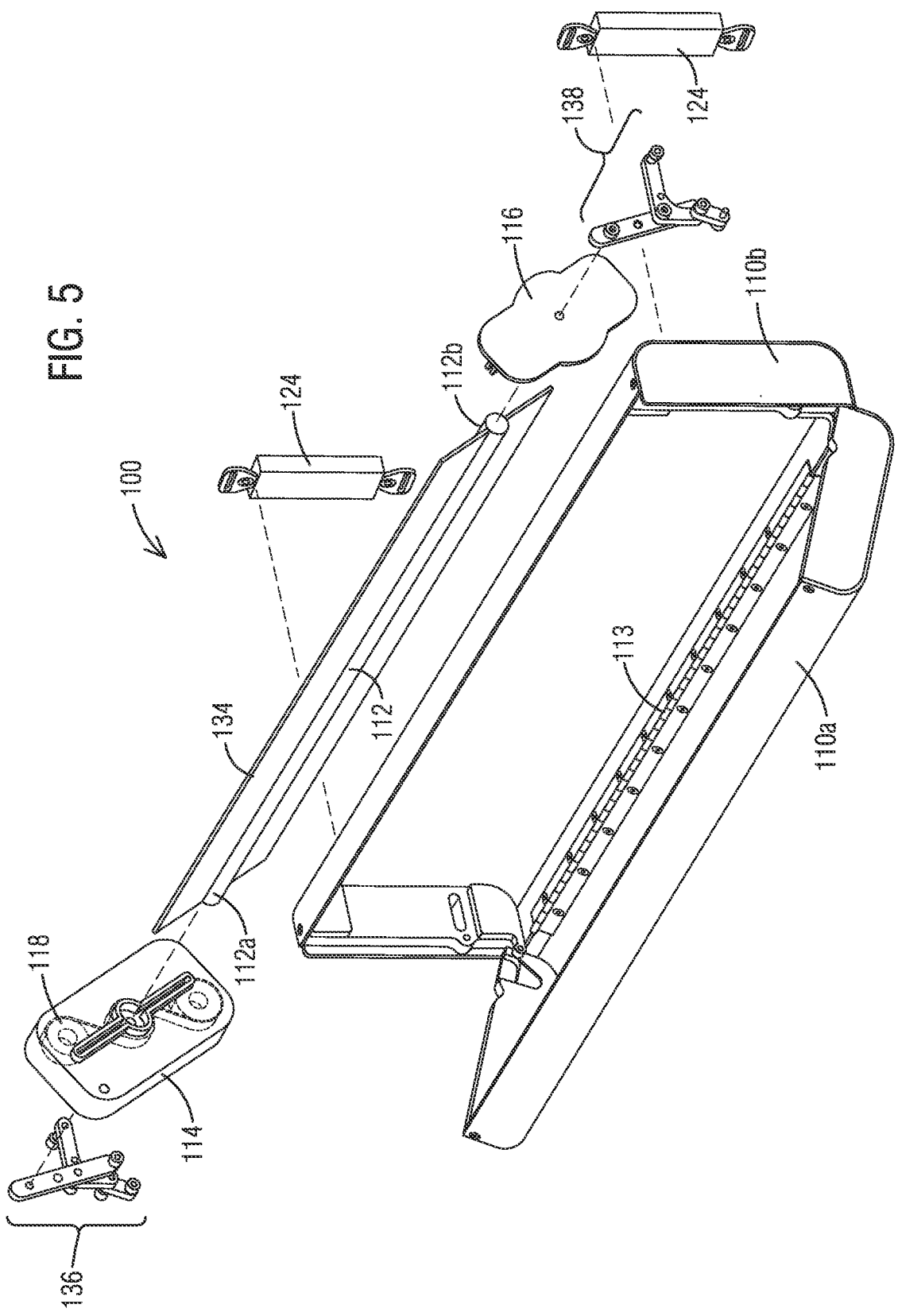
FIG. 5 is an exploded view of an embodiment of a vehicle cover device.

FIG. 5 provides an exploded view of the vehicle cover device embodiment 100 shown in FIGS. 1-4. The housing 110 is shown in an open position, demonstrating the attachment of the first housing portion 110a and the second housing portion 110b attached by hinge member 113 at one side thereof, respectively. roller 112 and roller platform 134 are removed from housing, roller is shown with first roller end 112a, and second roller end 112b. The first and second end members 114, 116 are provided, wherein the biasing member 118 is shown within the first end member 114. Linking members 136 and 138 are also shown. Attachment members 124 are provided. The term biasing member 118, as used herein, includes a spring. In one particular embodiment, the biasing member may include a torsion spring. As aforementioned, in some embodiments, the biasing member 118 may be biased to roll the car cover member 120 within the housing when the car cover member 120 is not locked in an extended position over a vehicle.

Figure 6:
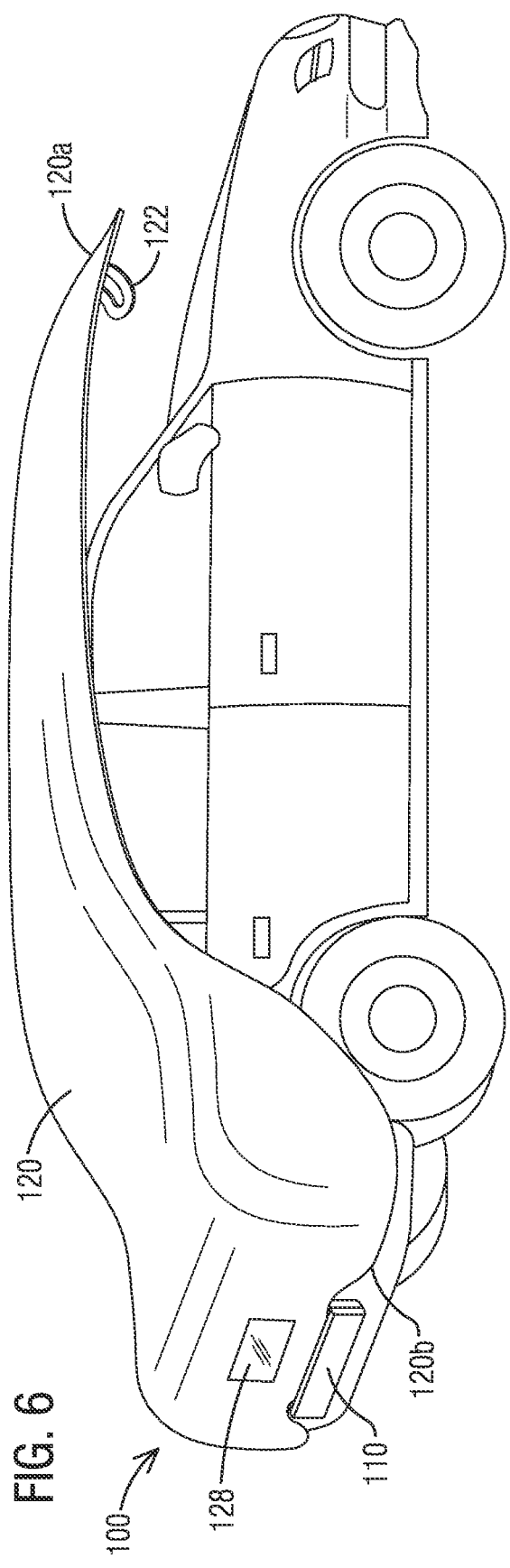
FIG. 6 is a view of an embodiment of a vehicle cover device mounted on a portion of a vehicle, wherein the cover member is partially extended over a portion of the vehicle.

FIG. 6 provides a view of the vehicle cover device 110 affixed onto a rear bumper portion of a vehicle, wherein the cover member 120 is extended partially therefrom, over the vehicle. In FIG. 6, a first (or leading) end of a vehicle cover member 120a is shown, and a bracket member 122 is associated with the first end of the vehicle cover member 120a. The bracket member may be used to retain the vehicle cover member 120 over the vehicle, when the vehicle cover member 120 is in a fully extended position, by associating with a front bumper of the vehicle. The bracket member 122 may be formed so as to associate with the front bumper of the vehicle, in one non-limiting embodiment, to maintain the vehicle cover member 120 on the vehicle against the resistance of the biasing member 118. In another embodiment, an elastic portion at or near the first end of the vehicle cover member 120a may be provided in addition to, or in place of the bracket member 122, to maintain the first end of the vehicle cover member 120a at the front end of the vehicle to keep the cover 120 in an extended position during use. As described herein, a portion of edge of the cover member 120 (which may include the first end of the cover member 120a, or may include the entire perimeter or other portions of the perimeter of the cover member 120 including, but not limited to the first end of the cover member 120a), may have an elastic component. In other embodiments, other attachment features may be provided, for example, a series of hooks for affixing to a portion of the underside of the car along an edge of the cover member 120 may be used to maintain the cover member 120 in an extended position over the vehicle.

Furthermore, a viewing window 128 may be provided in the cover member 120 as shown in FIG. 6, such that information on the vehicle may be viewable when the cover member 120 is in an extended position. For example, the viewing window 128 may be provided in a position allowing a view of the license plate of the vehicle when the cover member 120 is extended over the vehicle. In other embodiments, additional or alternative viewing windows 128 may be provided, for example near the front of the vehicle, allowing a view of the VIN number through the cover member 120.

Figure 7:
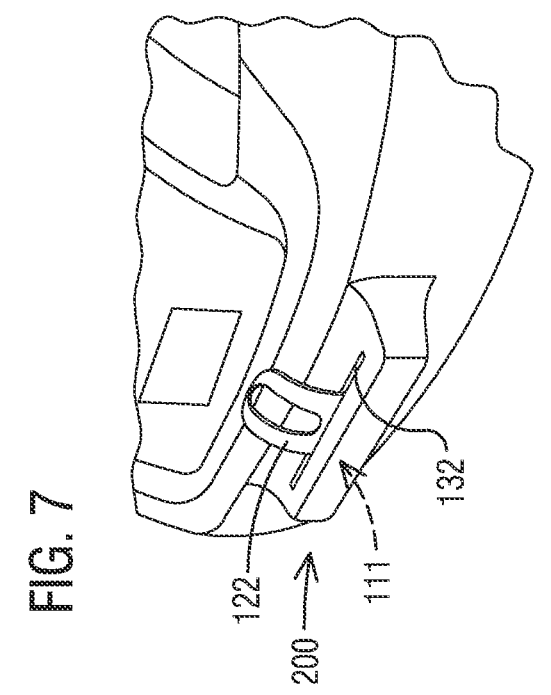
FIG. 7 is a partial view of the rear portion of a vehicle showing the vehicle cover device integrated into the bumper portion of the vehicle.

FIG. 7 provides a partial view of the rear portion of a vehicle showing a vehicle cover device integrated into a bumper portion of a vehicle in an embodiment 200. The vehicle cover device embodiment 200 of FIG. 7 includes a device housing 111 fully integrated into the bumper of the vehicle. An aperture 132 is provided in the bumper of the vehicle to allow the vehicle cover member 120 within the device housing 111 to extend from or retract into the housing 111 within the bumper. The bracket member 122 is shown as extending from the aperture 132 in FIG. 7. The bracket member 122 may be used to manually pull the cover member 120 to rotate the roller 112 within the housing 111 to extend the cover member 120 over the vehicle in one embodiment. The bracket member 112 may attach onto a bumper portion of the vehicle while the cover member 120 is retracted into the housing 111, and the vehicle cover device 200 is not in use. The bracket member 122 may also be used to manually guide the retraction of the car cover member 120 into the device housing 111 without scratching the vehicle along the way.

Figure 8:
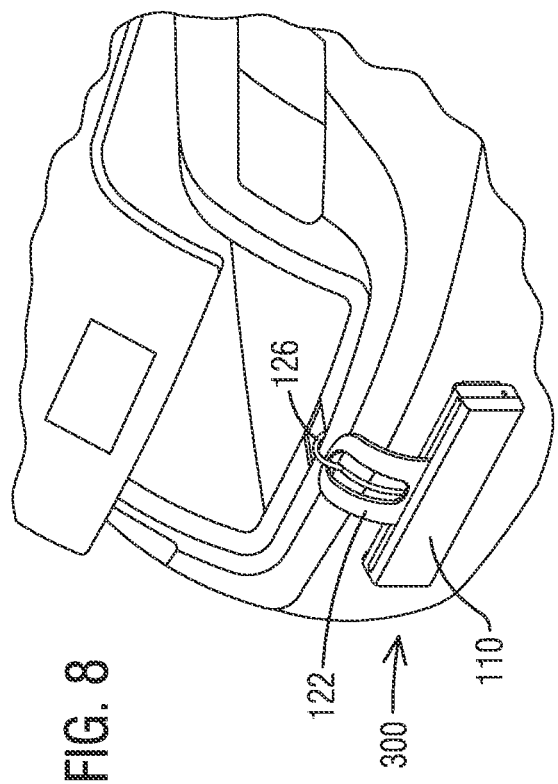
FIG. 8 is a partial view of the rear portion of a vehicle including an embodiment of the vehicle cover device comprising an attachment member and a security hook.

FIG. 8 is a partial view of the rear portion of a vehicle and an embodiment of the vehicle cover device 300 associated therewith, including a security hook 126 for interfacing between a rear portion of the vehicle and a trunk lid. The security hook 126 is configured to traverse an opening in the rear portion between the vehicle and the vehicle trunk lid in most manufactured vehicles, such that upon closing of the trunk lid, the vehicle cover device 110 is locked thereon. In this embodiment shown in FIG. 8, the bracket member 122 is provided, but the bracket member 122 may not be required.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A vehicle cover device, comprising:
   a vehicle cover member;
   a housing for receiving the vehicle cover member, wherein the housing comprises
      a first housing member and a second housing member, said first and second housing members are hingeably associated with one another allowing selective opening and closing of the housing;
      a roller rotatably disposed within the housing for receiving the vehicle cover member, the roller having a first end and a second end, and being rotatable in a first rotatable direction to roll the vehicle cover member around the roller in a retracted position, and a second rotatable direction to extend the vehicle cover member;
      a first end member and a second end member for abutting the first end and the second end, respectively, of the roller; and
      a biasing member associated with at least one of the first end member or the second end member to bias the roller in the first rotatable direction;

wherein the vehicle cover member is movable between an extended position, wherein at least a portion of the cover is removed from the housing, and the retracted position, wherein the vehicle cover member is retracted within the housing.

2. The vehicle cover device of claim 1, wherein the vehicle cover member comprises a first end and a second end, the second end for affixing to the roller, and the first end for associating with a front portion of a vehicle when the cover member is in a fully extended position to secure the vehicle cover member on the vehicle.

3. The vehicle cover device of claim 2, wherein the first end of the vehicle cover member may include an elastic portion, a bracket member for associating with a front portion of the vehicle, or an adhesive portion for attaching to a front portion of the vehicle, or a combination thereof.

4. The vehicle cover device of claim 1, further comprising an attachment member associated with the housing, to attach the housing onto a rear portion of the vehicle.

5. The vehicle cover device of claim 1, further comprising a security hook for interfacing with an opening in a rear portion of the vehicle, such that when a trunk door or trunk lid of the vehicle is in a closed position, the device is locked onto the vehicle.

6. The vehicle cover device of claim 4, wherein the attachment member comprises one or more attachment arms for securing the housing onto a portion of the vehicle.

7. The vehicle cover device of claim 4, wherein the attachment member comprises one or more brackets for affixing the housing onto a portion of the vehicle.

8. The vehicle cover device of claim 1 further comprising a motor, wherein the motor is coupled to an electrical source, the motor configured to drive the extension, retraction, or a combination thereof, of the vehicle cover member upon actuation of the motor.

9. The vehicle cover device of claim 8, further comprising a wireless control receiver including circuitry for controlling the motor configured to selectively wirelessly control extension or retraction of the vehicle cover member relative to the housing.

10. The vehicle cover device of claim 9, further comprising a wireless control transmitter for wirelessly controlling the motor by sending a signal to the wireless control receiver, whereby selective extension or retraction of the vehicle cover member is controlled.

11. The vehicle cover device of claim 10, wherein the wireless control transmitter comprises a remote control or a component of the vehicle actuated by a responsive member within the vehicle.

12. The vehicle cover device of claim 10, wherein a wireless connection between the receiver and the transmitter comprises a radio-frequency connection or a Bluetooth connection.

13. The vehicle cover device of claim 1, wherein the device housing is disposed within a bumper of the vehicle, and wherein the vehicle cover member is extendable and retractable through an aperture in the bumper.

14. The vehicle cover device of claim 1, wherein the housing further comprises a roller platform, said platform extending from the roller for receiving the vehicle cover member when the cover is retracted into the housing.

15. A vehicle cover device, comprising:
a vehicle cover member;
a housing for receiving the vehicle cover member, wherein the housing comprises
   a first housing member and a second housing member, said first and second housing members are hingeably connected to one another allowing selective opening and closing of the housing;
   a roller rotatably disposed within the housing for receiving the vehicle cover member, the roller having a first end and a second end, and being rotatable in a first rotatable direction to retract the vehicle cover member around the roller, and a second rotatable direction to extend the vehicle cover member from the housing;
   a first end member and a second end member for abutting the first end and the second end, respectively, of the roller;
a motor, wherein the motor is coupled to an electrical source, the motor configured to drive the extension, retraction, or a combination thereof, of the vehicle cover member upon actuation of the motor;
a wireless control receiver including circuitry for controlling the motor configured to selectively wirelessly control extension or retraction of the vehicle cover member; and
a wireless control transmitter for actuating the motor by sending a signal to the wireless control receiver;
wherein the vehicle cover member is movable between an extended position, wherein at least a portion of the cover is removed from the housing, and the retracted position, wherein the vehicle cover member is retracted within the housing.

16. The vehicle cover device of claim 15, wherein the vehicle cover member comprises a first end and a second end, the first end being affixed to the roller, and the second end for associating with a front portion of a vehicle when the cover member is in a fully extended position to secure the vehicle cover member on the vehicle.

17. The vehicle cover device of claim 16 wherein the first end of the vehicle cover member may include an elastic portion, a bracket member for associating with a front portion of the vehicle, or an adhesive portion for attaching to the front portion of the vehicle.

18. The vehicle cover device of claim 15, further comprising an attachment member associated with the housing, to attach the housing onto a rear portion of a vehicle.

* * * * *